(12) United States Patent
Campbell et al.

(10) Patent No.: US 9,002,010 B2
(45) Date of Patent: Apr. 7, 2015

(54) SECURE COMMUNICATION OF INFORMATION OVER A WIRELESS LINK

(75) Inventors: Keith M. Campbell, Cary, NC (US);
Rajiv N. Kantesaia, Cary, NC (US);
William G. Pagan, Durham, NC (US);
Marc V. Stracuzza, Durham, NC (US);
Michael N. Womack, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1038 days.

(21) Appl. No.: 12/556,685

(22) Filed: Sep. 10, 2009

(65) Prior Publication Data

US 2011/0058674 A1  Mar. 10, 2011

(51) Int. Cl.
| | |
|---|---|
| *H04L 29/06* | (2006.01) |
| *H04W 12/02* | (2009.01) |
| *H04W 12/04* | (2009.01) |
| *H04L 29/08* | (2006.01) |
| *G06F 21/62* | (2013.01) |
| *G06F 13/00* | (2006.01) |
| *G11B 20/00* | (2006.01) |

(52) U.S. Cl.
CPC .............. *H04W 12/02* (2013.01); *H04W 12/04* (2013.01); *H04L 67/1097* (2013.01); *G06F 21/6209* (2013.01); *G06F 13/00* (2013.01); *G11B 20/00862* (2013.01); *G11B 20/00869* (2013.01)

(58) Field of Classification Search
CPC . H04L 67/1097; G06F 21/6209; G06F 13/00; H04W 12/04; G11B 20/00862; G11B 20/00869

USPC ............... 713/150, 153, 171; 726/22, 26; 380/262, 270, 283, 33

See application file for complete search history.

(56) References Cited

U.S. PATENT DOCUMENTS

| 7,913,297 | B2 * | 3/2011 | Wyld ................................ 726/5 |
|---|---|---|---|
| 2002/0090089 | A1 | 7/2002 | Branigan et al. |
| 2003/0070080 | A1 * | 4/2003 | Rosen ........................... 713/187 |
| 2003/0208693 | A1 * | 11/2003 | Yoshida ......................... 713/201 |
| 2004/0196977 | A1 * | 10/2004 | Johnson et al. ............... 380/270 |
| 2005/0015534 | A1 | 1/2005 | Wu |
| 2005/0147245 | A1 * | 7/2005 | Hassan et al. ................... 380/44 |
| 2005/0160450 | A1 * | 7/2005 | Stephens et al. ................ 725/35 |

(Continued)

FOREIGN PATENT DOCUMENTS

KR   20060039793 A   5/2006

*Primary Examiner* — Carl Colin
*Assistant Examiner* — Gary Lavelle
(74) *Attorney, Agent, or Firm* — Edward J. Lenart; Katherine S. Brown; Kennedy Lenart Spraggins LLP

(57) ABSTRACT

Secure communication of information over a wireless link with apparatus including a blade management module and a plurality of blade servers, the blade servers connected for data communications with the blade management module through at least one wired link, the blade servers also connected for data communications with the blade management module through at least one wireless link, including sharing an encryption key between the blade management module and one or more of the blade servers only through the at least one wired link connecting the blade management module to the one or more blade servers; encrypting information by the blade management module with the encryption key; transmitting the encrypted information by the blade management module to the one or more blade servers through the at least one wireless link; and decrypting the encrypted information by the blade server with the encryption key.

6 Claims, 6 Drawing Sheets

(56) References Cited

U.S. PATENT DOCUMENTS

| | | |
|---|---|---|
| 2006/0077917 A1 | 4/2006 | Brahmajosyula et al. |
| 2006/0184349 A1 | 8/2006 | Goud et al. |
| 2006/0229992 A1* | 10/2006 | Morten et al. ................. 705/50 |
| 2007/0027948 A1* | 2/2007 | Engebretsen ................ 709/203 |
| 2008/0022377 A1* | 1/2008 | Chen et al. ...................... 726/5 |
| 2008/0098221 A1* | 4/2008 | Hashimoto et al. ........... 713/169 |
| 2008/0253566 A1* | 10/2008 | Hidaka ......................... 380/255 |
| 2008/0256370 A1 | 10/2008 | Campbell et al. |
| 2008/0303648 A1* | 12/2008 | Day ............................. 340/431 |

* cited by examiner

SECURE COMMUNICATION OF INFORMATION OVER A WIRELESS LINK

BACKGROUND OF THE INVENTION

1. Field of the Invention

The field of the invention is data processing, or, more specifically, methods, apparatus, and products for secure communication of information over a wireless link.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas that has seen substantial improvement is wireless data communications. Wireless security, however, remains an area of concern. In particular, wireless data communications represent a security weakness in the area of data privacy, particularly when using shared, private, or 'symmetric' encryption keys to effect privacy. Sharing a symmetric key or pair of keys between a sender and receiver of information over a wireless link is inherently insecure because the key pairs are transmitted over a link that can be observed by anyone within radio range.

SUMMARY OF THE INVENTION

Methods, apparatus, and computer program products are described for secure communication of information over a wireless link, the apparatus including a blade management module and a plurality of blade servers, the blade servers connected for data communications with the blade management module through at least one wired link, the blade servers also connected for data communications with the blade management module through at least one wireless link, including sharing an encryption key between the blade management module and one or more of the blade servers only through the at least one wired link connecting the blade management module to the one or more blade servers; encrypting information by the blade management module with the encryption key; transmitting the encrypted information by the blade management module to the one or more blade servers through the at least one wireless link; and decrypting the encrypted information by the blade server with the encryption key.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXAMPLE EMBODIMENTS

Figure 1:
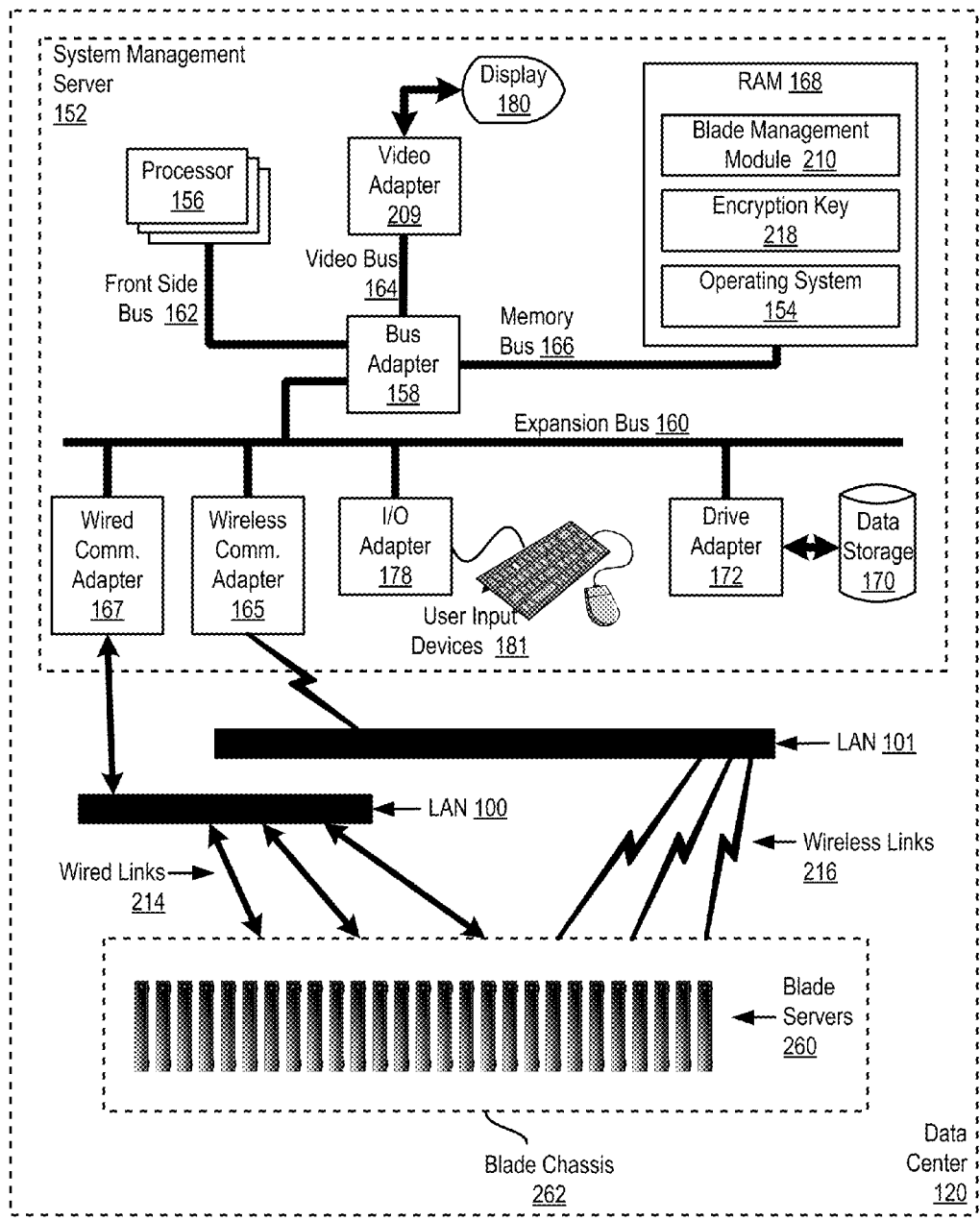
FIG. 1 sets forth a functional block and network diagram of apparatus for secure communication of information over a wireless link according to embodiments of the present invention.

Example methods, apparatus, and products for secure communication of information over a wireless link in accordance with the present invention are described with reference to the accompanying drawings, beginning with FIG. 1. FIG. 1 sets forth a functional block and network diagram of apparatus for secure communication of information over a wireless link according to embodiments of the present invention.

The apparatus of FIG. 1 is primarily automated computing machinery disposed within a data center, including a system management server (152) and a number of blade servers (260) in a blade chassis (262). A data center, sometimes called a server farm, is a facility used to house computer systems and associated components, such as telecommunications, storage systems, and the like. A data center generally includes redundant or backup power supplies, redundant data communications connections, environmental controls such as air conditioning and fire suppression, as well as security devices. Implementation in a data center as such is not a requirement of the present invention, but it is depicted here for its explanatory value, because it support many embodiments of the present invention.

Blade servers (260) are stripped down computer servers with a modular design, the 'blade form factor,' optimized to minimize the use of physical space. Compared to a standard rack-mount server, blade servers have many components removed to save space, minimize power consumption and other considerations, while still having all the functional components to be considered a computer. A blade chassis (262), which can hold multiple blade servers, provides services such as power, cooling, networking, various interconnects—as well as blade management services, in this example, through system management server (152).

The system management server (152), as well as each of the blade servers of course, includes at least one computer processor (156) or 'CPU' as well as random access memory (168) ('RAM') which is connected through a high speed memory bus (166) and bus adapter (158) to the processor (156) and to other components of the system management server (152). Stored in RAM (168) is a blade management module (210), a module of automated computing machinery that operates the system management server to carry out secure communication of information over a wireless link according to embodiments of the present invention. The blade management module (210) here is composed of computer program instructions stored in RAM, but this architecture is for ease of explanation, not a limitation of the present invention. A blade management module (210) according to embodiments of the present invention can be implemented in a variety of other ways as will occur to those of skill in the art, including, for example, as a complex programmable logic device ('CPLD'), a field programmable gate array ('FPGA'), or an application specific integrated circuit ('ASIC'). Also stored in RAM (168) is an operating system (154). Operating systems useful for secure communication of information over a wireless link according to embodiments of the present invention include UNIX™, Linux™, Microsoft XP™, AIX™, IBM's i5/OS™, and others as will occur to those of skill in the art. The operating system (154) and the blade management module (210) in the example of FIG. 1 are shown in RAM (168), but many components of such software typically are stored in non-volatile memory also, such as, for example, on a disk drive (170).

The system management server (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that carry out secure communication of information over a wireless link according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example system management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The blade management module (210) carries out secure communications of information over a wireless link by sharing an encryption key (218) between the blade management module and one or more of the blade servers (260)—only through the wired links (214). An encryption key is a piece of special information, typically a numeric or alpha-numeric code, used as a parameter of a process of transforming information, referred to as 'plaintext,' using an algorithm, called a 'cipher,' to make the information unreadable, referred to as 'encrypted,' to anyone who does not possess the special information, the key. The result of this process of encryption is encrypted information, sometimes referred to as 'ciphertext.' In some contexts, it is possible for the word 'encryption' to implicitly refer to the reverse process, decryption, the process of making the encrypted information readable again. In this specification, the distinction is made explicitly. When referring to encryption, we say "encryption." When referring to decryption, the word 'decryption' is used.

Sharing the key, unencrypted, that is, in plain text, over the wired links is nevertheless secure, because the wired links in this example are installed and operated in an enterprise data center (120) under control of an enterprise system administrator. Unlike the wireless links (216), no one can casually observe the content transmitted over the wired links (214) merely because they are within radio range of the links. There are a number of ways to carry out such sharing of the encryption key. The blade management module (210) can generate the key (218) and transmit it through the wired links (214) to the blade servers (260), for example, or the blade servers (260) can generate each its own key and transmit their keys through the wired links (214) to the blade management module (210), and so on.

Having set up a shared key by use of wired links, the blade management module (210) encrypts information with the encryption key (218) and transmits the encrypted information to the blade servers (260) through one or more of the wireless links (216), and the blade servers decrypt the encrypted information with the encryption key. This transmission over the wireless links is now secure because it is encrypted with a shared, symmetric encryption key (218) before it is transmitted and then decrypted with the same key when it is received by its intended recipient. Anyone attempting to listen in with an illicit receiver will be unable to read the encrypted information transmitted over the wireless links (216).

The exemplary computer (152) of FIG. 1 includes two communications adapters (167, 165) for data communications with other computers, particularly the blade servers (260) through two data communications networks (100, 101). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for secure communication of information over a wireless link according to embodiments of the present invention include modems for wired dial-up communications, Ethernet (IEEE 802.3) adapters for wired data communications network communications, and 802.11 adapters for wireless data communications network communications.

In this example, communications adapter (167) is configured for wired communications with the blade servers (260) through network (100) and wired data communications links (214). Communications adapter (165) is configured for wireless communications with the blade servers (260) through network (101) and wireless data communications links (216). It is in the context of these two particular networks (100, 101) that the problems addressed by the current invention are helpfully explained—because the wire network (100) in this example represents an old, slow, legacy network in the data center or the blade chassis, while the wireless network (101) represents a modern, high speed network. For moving large quantities of information around among the blade servers and the blade management module in the data center, it is desirable to use the wireless network (101), which is unsecure without encryption. So the problem is how to set up the encryption. No shared private key would be needed for asymmetric encryption, but it is too slow. So the problem is how to set up symmetric encryption with a shared private key, a key that by definition must be shared, transmitted from one computer to another around the data center—which cannot be done over the wireless network because, in the first instance at least, there is no way to encrypt the key because the sender and receiver do not yet share the key. The answer is to share the key across the secure wireline network (100), through the wired links (214), and then use the key symmetrically to encrypt and decrypt information transmitted over the high speed, wireless network (101) through the wireless links (216).

The arrangement of servers and other devices making up the exemplary system illustrated in FIG. 1 are for explanation, not for limitation. Data processing systems useful for secure communication of information over a wireless link according to various embodiments of the present invention may include additional servers, routers, switches, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
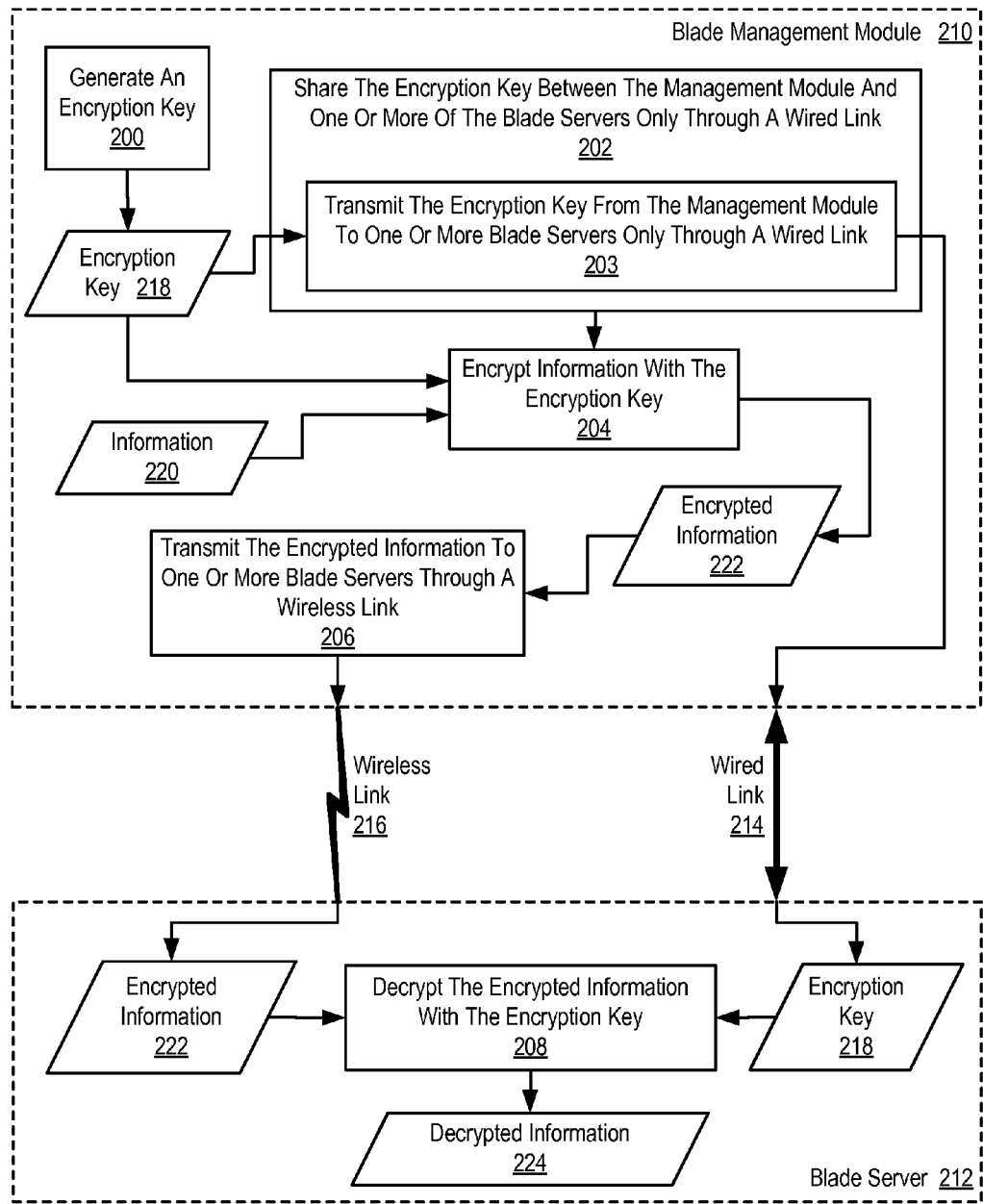
FIGS. 2-6 set forth flow charts illustrating methods of secure communication of information over a wireless link according to embodiments of the present invention.
Figure 3:
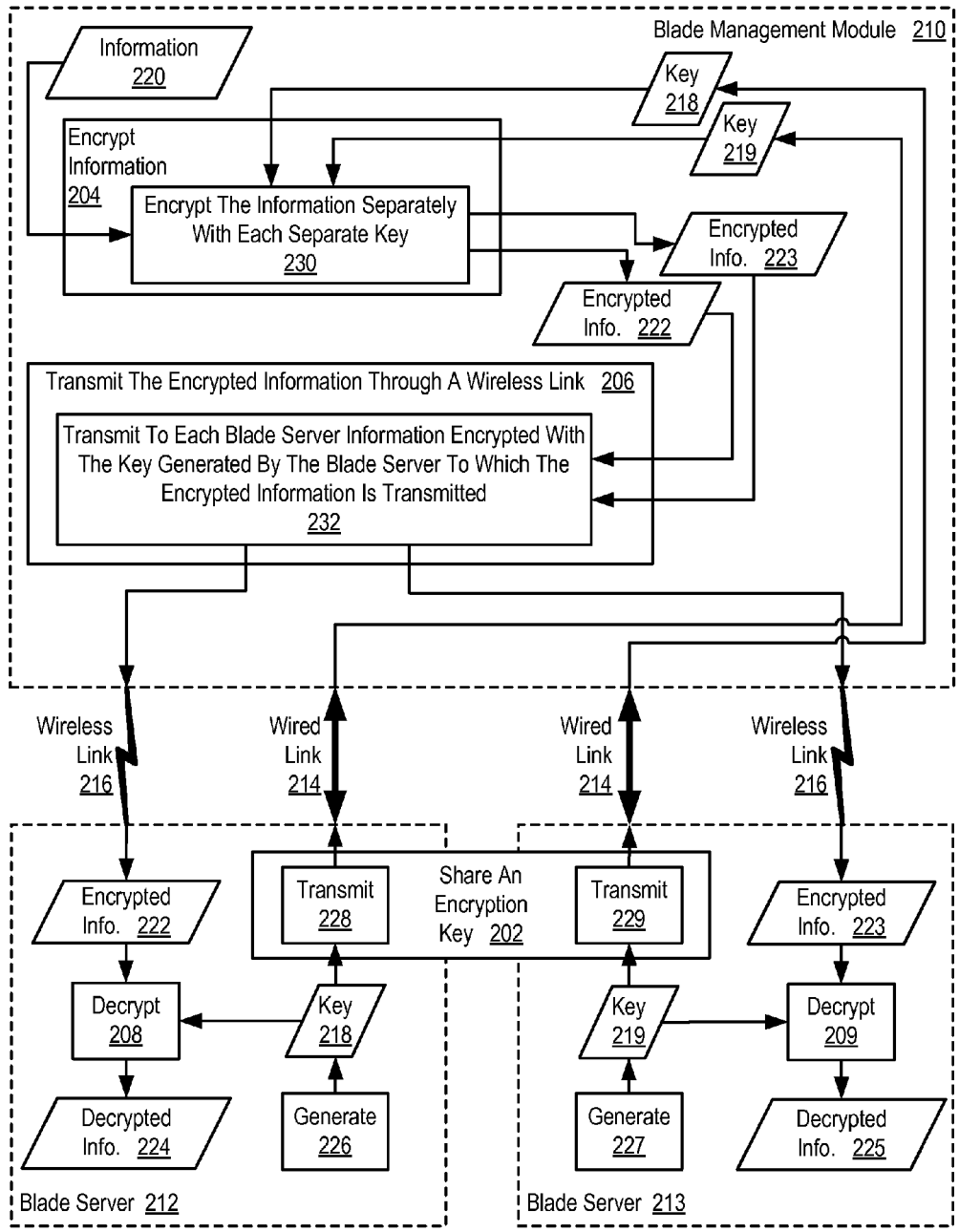

For further explanation, FIG. 3 sets forth a flow chart illustrating an example method of secure communication of information over a wireless link according to embodiments of the present invention. The method of FIG. 2 is carried out in apparatus, like that illustrated and described above with reference to FIG. 1, that includes a blade management module (210) and a number of blade servers (212)—in this example, for ease of explanation, only one blade server (212), but typically more than one, often many. The blade server(s) (212) is connected for data communications with the blade management module (210) through at least one wired link (214) and through also at least one wireless link (216).

The method of FIG. 2 includes the blade management module's generating (200) an encryption key (218)—which can be, for example, a randomly generated binary integer of a predetermined size, 32 bits, 64 bits, 128 bits, and so on. The method of FIG. 2 also includes sharing (202) the encryption key between the blade management module and one or more of the blade servers only through the at least one wired link connecting the blade management module to the one or more blade servers. In the method of FIG. 2, sharing the encryption key includes transmitting (203) the encryption key from the blade management module to the one or more blade servers only through the wired link connecting the blade management module to the blade server.

The method of FIG. 2 also includes encrypting (204) information (220) by the blade management module (210) with the encryption key (218). With both the blade management module and the blade server using the same key, this is an example of so-called symmetric-key encryption, also known as secret-key, single-key, shared-key, one-key, and private-key encryption. Symmetric-key encryption algorithms or 'ciphers' operate either on a stream of information or on blocks of information. Stream ciphers encrypt the bytes of information one at a time, and block ciphers take a number of bytes and encrypt them as a single unit. Blocks of 64 bits have been commonly used. The Advanced Encryption Standard ('AES') cipher as approved by the U.S. National Institute of Standards and Technology in December 2001 uses 128-bit blocks. Some examples of popular and well-respected symmetric algorithms that can be adapted for secure communication of information over a wireless link according to embodiments of the present invention include AES, Twofish, Serpent, Blowfish, CAST5, RC4, TDES, and IDEA.

The method of FIG. 2 also includes transmitting (206) the encrypted information (222) by the blade management module to the one or more blade servers through a wireless link (216), and the method of FIG. 2 also includes decrypting (208) the encrypted information by the blade server with the encryption key. The cipher for decryption is the converse of whatever cipher the blade management module used to encrypt the transmitted information. Of course we could use an asymmetric cipher, with no need to share a private key, but asymmetric ciphers are much, much slower than symmetric ones.

For further explanation, FIG. 3 sets forth a flow chart illustrating a further example method for of secure communication of information over a wireless link according to embodiments of the present invention. The method of FIG. 3, like the method of FIG. 2, is carried out in apparatus, like that illustrated and described above with reference to FIG. 1, that includes a blade management module (210) and a number of blade servers (212, 213)—in this example, for ease of explanation, only two blade servers, but typically more than one, often many. The blade servers (212, 213) are connected for data communications with the blade management module (210) through wired links (214) and through also wireless links (216).

The method of FIG. 3 is also similar to the method of FIG. 2 in that the method of FIG. 3 includes sharing (202) an encryption key, actually, here, two keys (218, 219), between the blade management module (210) and the blade servers (212, 213) through wired links (214), encrypting (204) information (220) by the blade management module (210) with the encryption keys (218, 219), and transmitting (206) the encrypted information (222) by the blade management module (210) to the blade servers (212, 213) through wireless links (216). But that is pretty much the end of the similarities. In the method of FIG. 3, however, it is the blade servers (212, 213) that generate the encryption key, each blade server generating (226, 227) its own separate key (218, 219). In addition, in the method of FIG. 3, the step of sharing (202) an encryption key includes transmitting (228, 229) the separate encryption keys (218, 219) from the blade servers (212, 213) to the blade management module (210) only through the wired links (214) connecting the blade management module (210) to the blade servers (212, 213).

Also in the method of FIG. 3, the step of encrypting (204) information includes encrypting (230) the information (220) separately with each separate key (218, 219), thereby separate sets of encrypted information (222, 223), one for each key, in this example, one for each blade server. Moreover, the step of transmitting (232) the encrypted information (222, 223) includes transmitting (232) to each blade server (212, 213) encrypted information (222, 223) encrypted with the key generated by the blade server to which the encrypted information is transmitted. The information (220) encrypted with key (218) from blade server (212) is transmitted (232) in separate packets of encrypted information (222) to blade server (212). Blade server (212) can decrypt because blade server (212) is in possession of key (218), which blade server (212) earlier generated (226) and transmitted (228) to management server (210). The information (220) encrypted with key (219) from blade server (213) is transmitted (232) in separate packets of encrypted information (223) to blade server (213). Blade server (213) can decrypt because blade server (213) is in possession of key (219), which blade server (213) earlier generated (227) and transmitted (229) to management server (210).

Figure 4:
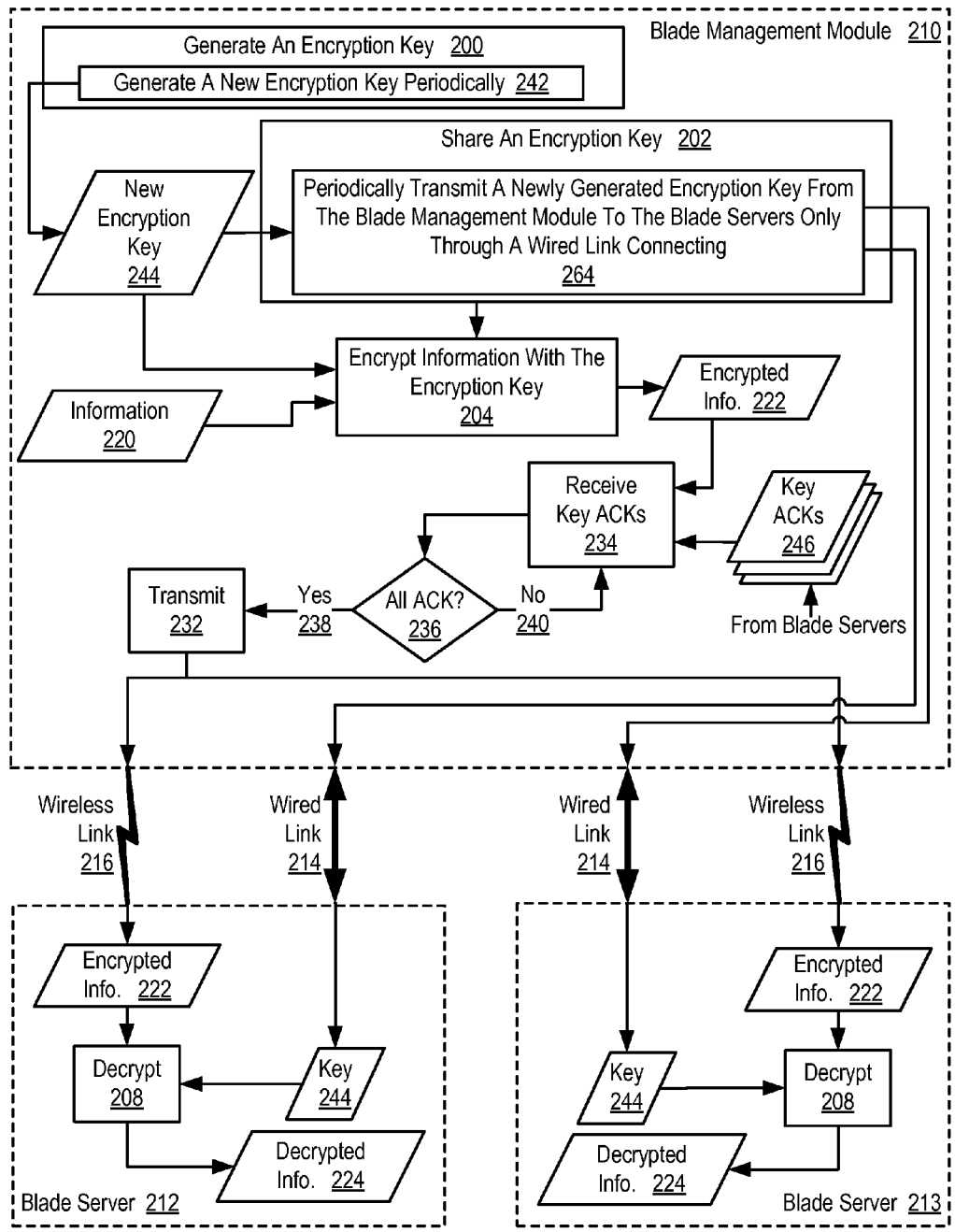

For further explanation, FIG. 4 sets forth a flow chart illustrating a further example method for of secure communication of information over a wireless link according to embodiments of the present invention. The method of FIG. 4, like the methods of FIGS. 2 and 3, is carried out in apparatus, like that illustrated and described above with reference to FIG. 1, that includes a blade management module (210) and a number of blade servers (212, 213)—in this example, for ease of explanation, only two blade servers, but typically more than one, often many. The blade servers (212, 213) are connected for data communications with the blade management module (210) through wired links (214) and through also wireless links (216).

The method of FIG. 4 is also similar to the methods of FIGS. 2 and 3 in that the method of FIG. 4 includes sharing (202) an encryption key (244) between the blade management module (210) and the blade servers (212, 213) through wired links (214), encrypting (204) information (220) by the blade management module (210) with the encryption key, and transmitting (206) the encrypted information (222) by the blade management module (210) to the blade servers (212, 213) through wireless links (216). In the method of FIG. 4, however, generating (200) an encryption key, carried out by the blade management module (210), includes generating (242) a new encryption key (244) periodically. Such periodicity can be based upon a predetermined interval of time, a predetermined number of encryptions with a current key, and so on, as may occur to those of skill in the art.

Also in the example of FIG. 4, sharing (202) the encryption key includes periodically transmitting (264) a newly generated encryption key (244) from the blade management module (210) to the blade servers (212, 213) only through wired links (214) connecting the blade management module to the blade servers. Further in the example method of FIG. 4, the step of transmitting (232) the encrypted information (222) is carried out only after each of the one or more blade servers acknowledges receipt of the newly generated encryption key. The blade management module receives (234) from the blade servers acknowledgments (246) of receipt of a new encryption key. The acknowledgements (246) are referred to in FIG. 4 as 'Key ACKs.' Before transmitting (232) information encrypted with a new key, the blade management server determines (236) whether all blade servers that will use the new key have acknowledged receipt of the new key. If all blade servers that will use the new key have not (240) acknowledged receipt of the new key, the blade management server continues to receive (234) acknowledgments until (238) all blade servers that will use the new key have acknowledged receipt of the new key.

Figure 5:
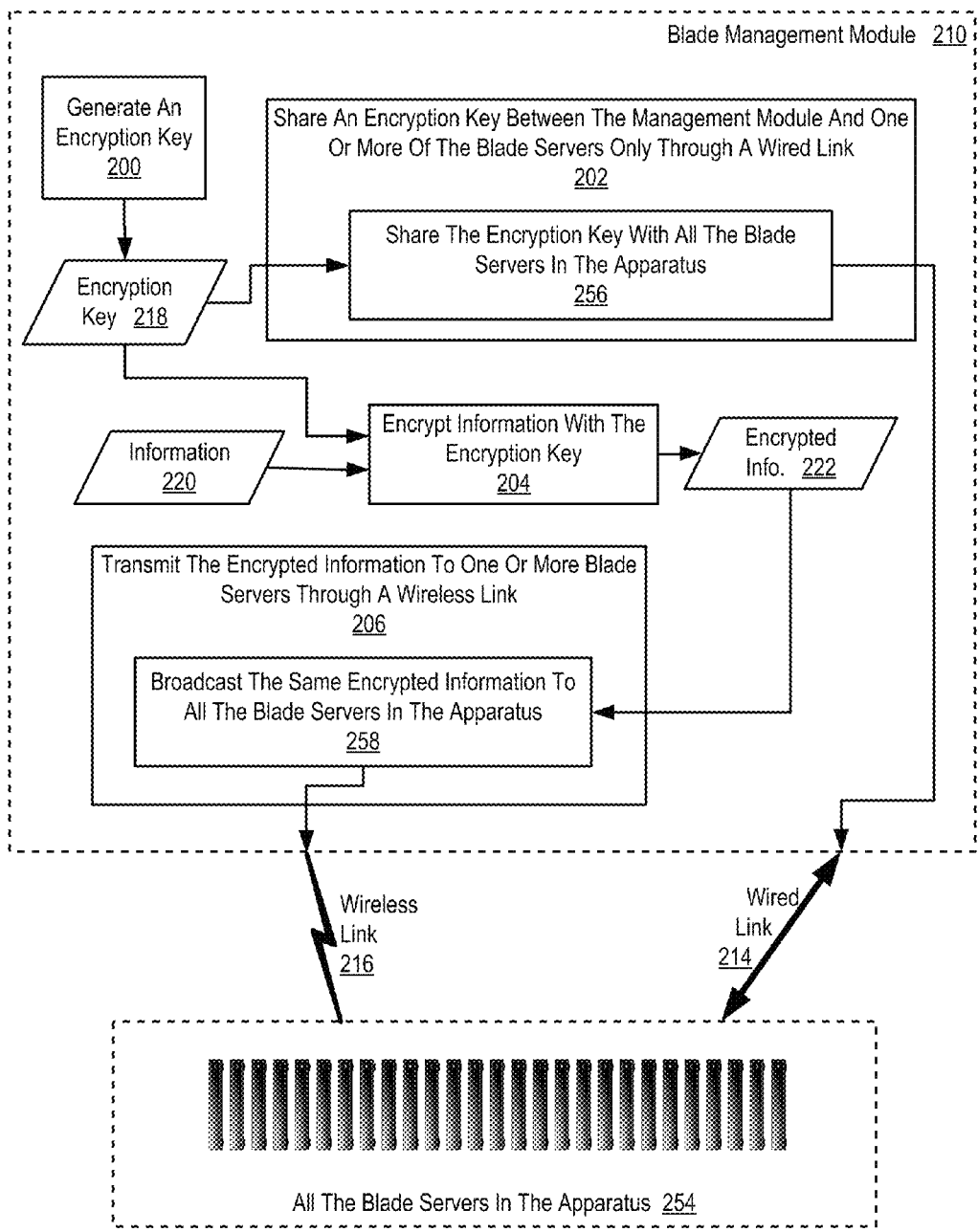

For further explanation, FIG. 5 sets forth a flow chart illustrating a further example method for of secure communication of information over a wireless link according to embodiments of the present invention. The method of FIG. 5, like the method of FIG. 2, is carried out in apparatus, like that illustrated and described above with reference to FIG. 1, which includes a blade management module (210) and a number of blade servers (254)—in this example, all the blade servers in communication with the blade management module. The blade servers (254) are connected for data communications with the blade management module (210) through at least one wired link (214) and also through at least one wireless link (216).

The method of FIG. 5 is also similar to the method of FIG. 2 in that the method of FIG. 5 includes sharing (202) an encryption key (218) between the blade management module (210) and the blade servers (254) through a wired link (214), encrypting (204) information (220) by the blade management module (210) with the encryption key (218), and transmitting (206) the encrypted information (222) to the blade servers (248) through a wireless link (216). In the method of FIG. 5, however, sharing (202) the encryption key also includes sharing (256) the encryption key with all the blade servers in the apparatus, and transmitting (206) the encrypted information (222) also includes broadcasting (258) the same encrypted information to all the blade servers in the apparatus.

Figure 6:
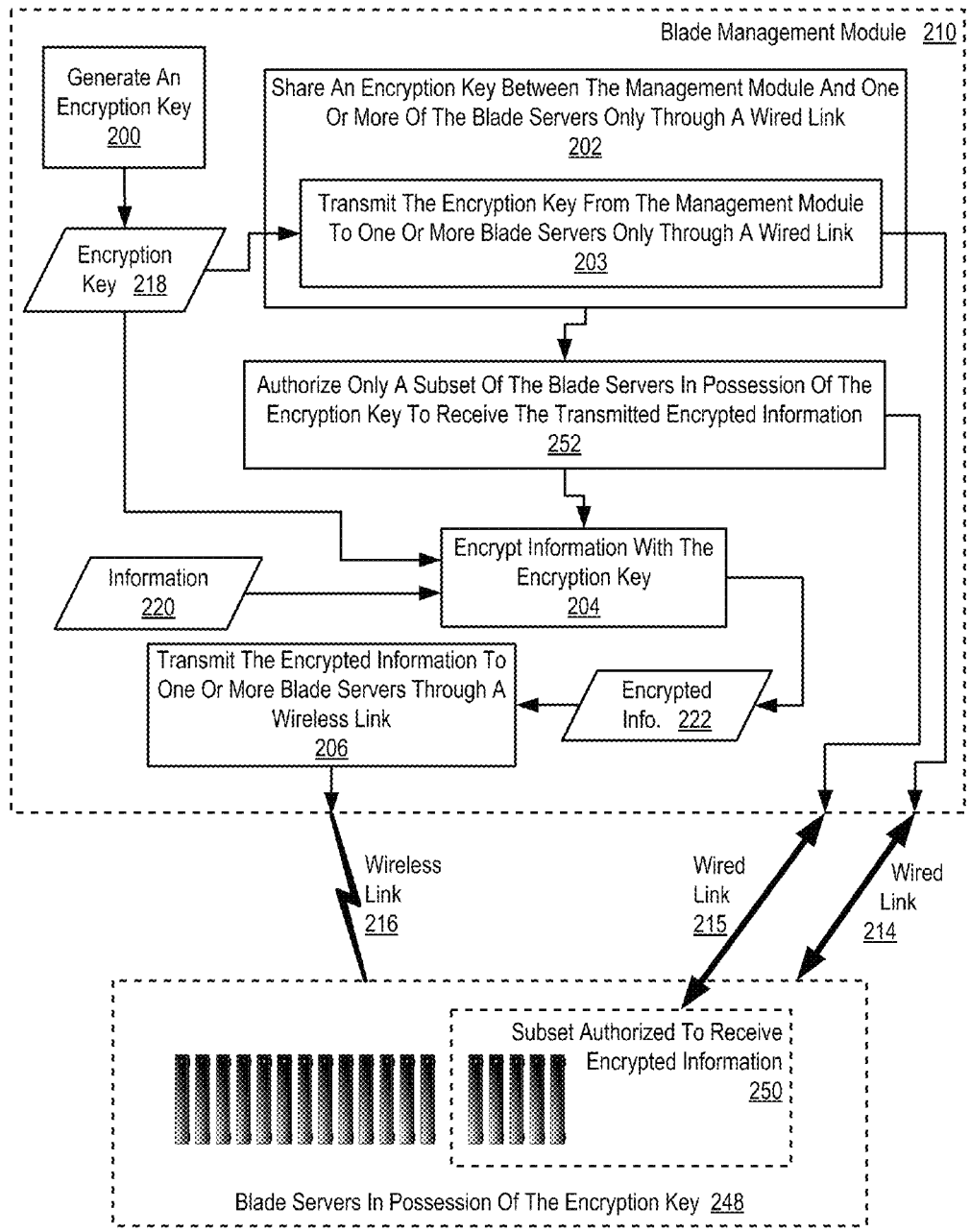

For further explanation, FIG. 6 sets forth a flow chart illustrating a further example method for of secure communication of information over a wireless link according to embodiments of the present invention. The method of FIG. 6, like the method of FIG. 2, is carried out in apparatus, like that illustrated and described above with reference to FIG. 1, which includes a blade management module (210) and a number of blade servers (248). The blade servers (248) are connected for data communications with the blade management module (210) through wired links (214, 215) and through also one or more wireless links (216). The method of FIG. 6 is also similar to the method of FIG. 2 in that the method of FIG. 6 includes sharing (202) an encryption key (218) between the blade management module (210) and the blade servers (248) through one or more wired links (214), encrypting (204) information (220) by the blade management module (210) with the encryption key (218), and transmitting (206) the encrypted information (222) by the blade management module (210) to the blade servers (248) through wireless links (216).

In the example of FIG. 6, all the blade servers (248) in communication with the blade management module (210) are placed in possession of the same encryption key (218)—but only a subset of them is authorized to use the key. That is, the method of FIG. 6 includes authorizing (252) by the blade management module through a wireline connection (215) between the blade management module and the blade servers only a subset (250) of the blade servers in possession of the encryption key to receive the transmitted encrypted information (222). In this way, encrypted information can be physically broadcast to all the servers (248) in communication with the blade management module and at the same time effectively directed only to a subset (250) of the servers.

In view of the explanations set forth above, readers will recognize that the benefits of secure communication of information over a wireless link according to embodiments of the present invention include the use of a slow legacy wire bus in a blade-oriented computing environment for secure transmission of a shared encryption key, a small quantity of data for which transmission speed is relatively unimportant, followed by secure, encrypted use of high speed, wireless links for transmission of the more voluminous encrypted information.

Example embodiments of the present invention are described largely in the context of a fully functional computer system for secure communication of information over a wireless link. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of secure communication of information over a wireless link, the method carried out in apparatus that includes a blade management module and a plurality of blade servers, the blade servers connected for data communications with the blade management module through at least one wired link, the blade servers also connected for data communications with the blade management module through at least one wireless link, the method comprising:
generating a separate encryption key by each of the plurality of blade servers;
generating a new encryption key by the blade management module periodically;
sharing the separate encryption key between the blade management module and the plurality of blade servers only through the at least one wired link connecting the blade management module to the blade servers, including transmitting, by each blade server that generated the separate encryption key, the separate encryption key generated by the blade server to the blade management module only through the at least one wired link connecting the blade management module to the blade server; and
periodically transmitting the new encryption key from the blade management module to the plurality of blade servers only through the at least one wired link connecting the blade management module to the plurality of blade servers;
encrypting information by the blade management module with the separate encryption key, including encrypting the information separately with each separate encryption key;
transmitting the encrypted information by the blade management module to the one or more blade servers through the at least one wireless link, including transmitting to each blade server encrypted information encrypted with the separate encryption key generated by the blade server to which the encrypted information is transmitted; and
transmitting the encrypted information to the plurality of blade servers only after each of the blade servers acknowledges receipt of the new encryption key; and
authorizing by the blade management module through the wireline connections between the blade management module and the blade servers only a subset of the blade servers in possession of the new encryption key to use the new encryption key to decrypt the encrypted information; and
decrypting the encrypted information with the new encryption key by each blade server in the subset of the blade servers.

2. The method of claim 1 wherein:
periodically transmitting the new encryption key further comprises sharing the new encryption key with all the blade servers in the apparatus only through the at least one wired link connecting the blade management module to the blade servers; and
transmitting the encrypted information further comprises broadcasting the same encrypted information to all the blade servers in the apparatus.

3. An apparatus for secure communication of information over a wireless link, the apparatus comprising:
a blade management module and a plurality of blade servers, the blade servers connected for data communications with the blade management module through at least one wired link, the blade servers also connected for data communications with the blade management module through at least one wireless link; and
a computer processor and a computer memory operatively coupled to the computer processor, the computer memory having disposed within it computer program instructions which when executed upon the computer processor cause the apparatus to function by:
generating a separate encryption key by each of the plurality of blade servers;
generating a new encryption key by the blade management module periodically;
sharing the separate encryption key between the blade management module and the plurality of blade servers only through the at least one wired link connecting the blade management module to the blade servers, including transmitting, by each blade server that generated the separate encryption key, the separate encryption key generated by the blade server to the blade management module only through the at least one wired link connecting the blade management module to the blade server; and
periodically transmitting the new encryption key from the blade management module to the plurality of blade servers only through the at least one wired link connecting the blade management module to the plurality of blade servers;
encrypting information by the blade management module with the separate encryption key, including encrypting the information separately with each separate encryption key;
transmitting the encrypted information by the blade management module to the one or more blade servers through the at least one wireless link, including transmitting to each blade server encrypted information encrypted with the separate encryption key generated by the blade server to which the encrypted information is transmitted; and
transmitting the encrypted information to the plurality of blade servers only after each of the blade servers acknowledges receipt of the new encryption key; and
authorizing by the blade management module through the wireline connections between the blade management module and the blade servers only a subset of the blade servers in possession of the new encryption key to use the new encryption key to decrypt the encrypted information; and
decrypting the encrypted information with the new encryption key by each blade server in the subset of the blade servers.

4. The apparatus of claim 3 wherein:
periodically transmitting the new encryption key further comprises sharing the new encryption key with all the blade servers in the apparatus only through the at least one wired link connecting the blade management module to the blade servers; and
transmitting the encrypted information further comprises broadcasting the same encrypted information to all the blade servers in the apparatus.

5. A computer program product for secure communication of information over a wireless link, the computer program product comprising computer program instructions for operation of apparatus including a computer processor, a blade management module and a plurality of blade servers, the blade servers connected for data communications with the blade management module through at least one wired link, the blade servers also connected for data communications with the blade management module through at least one wireless link, the computer program product disposed upon a non-signal machine-readable storage medium, the computer program product comprising computer program instructions which when executed upon the computer processor cause the apparatus to function by:
generating a separate encryption key by each of the plurality of blade servers;
generating a new encryption key by the blade management module periodically;

sharing the separate encryption key between the blade management module and the plurality of blade servers only through the at least one wired link connecting the blade management module to the blade servers, including transmitting, by each blade server that generated the separate encryption key, the separate encryption key generated by the blade server to the blade management module only through the at least one wired link connecting the blade management module to the blade server; and periodically transmitting the new encryption key from the blade management module to the plurality of blade servers only through the at least one wired link connecting the blade management module to the plurality of blade servers;

encrypting information by the blade management module with the separate encryption key, including encrypting the information separately with each separate encryption key;

transmitting the encrypted information by the blade management module to the one or more blade servers through the at least one wireless link, including transmitting to each blade server encrypted information encrypted with the separate encryption key generated by the blade server to which the encrypted information is transmitted; and transmitting the encrypted information to the plurality of blade servers only after each of the blade servers acknowledges receipt of the new encryption key; and authorizing by the blade management module through the wireline connections between the blade management module and the blade servers only a subset of the blade servers in possession of the new encryption key to use the new encryption key to decrypt the encrypted information; and decrypting the encrypted information with the new encryption key by each blade server in the subset of the blade servers.

6. The computer program product of claim 5 wherein:

periodically transmitting the new encryption key further comprises sharing the new encryption key with all the blade servers in the apparatus only through the at least one wired link connecting the blade management module to the blade servers; and transmitting the encrypted information further comprises broadcasting the same encrypted information to all the blade servers in the apparatus.

* * * * *